(12) United States Patent
Arizmendi

(10) Patent No.: US 9,624,737 B1
(45) Date of Patent: Apr. 18, 2017

(54) LOCKING COLLAR

(71) Applicant: Centergenics, LLC, Spring, TX (US)

(72) Inventor: Napoleon Arizmendi, Magnolia, TX (US)

(73) Assignee: Centergenics, LLC, The Woodlands, TX (US)

( * ) Notice: Subject to any disclaimer, the term of this patent is extended or adjusted under 35 U.S.C. 154(b) by 146 days.

(21) Appl. No.: 14/485,448

(22) Filed: Sep. 12, 2014

Related U.S. Application Data

(60) Provisional application No. 61/877,904, filed on Sep. 13, 2013.

(51) Int. Cl.
*E21B 17/10* (2006.01)
*F16L 27/10* (2006.01)

(52) U.S. Cl.
CPC ...... *E21B 17/1078* (2013.01); *F16L 27/1025* (2013.01)

(58) Field of Classification Search
None
See application file for complete search history.

(56) References Cited

U.S. PATENT DOCUMENTS

| | | | | |
|---|---|---|---|---|
| 2,671,641 A * | 3/1954 | Hinkle | ............... | E21B 17/1085 175/325.5 |
| 2,901,269 A * | 8/1959 | Rickard | ............... | F16L 17/035 285/111 |
| 2,907,189 A * | 10/1959 | Flieg | ............... | F16D 41/206 464/160 |
| 2,936,625 A * | 5/1960 | Heiseler | ............... | F16B 7/20 192/223.4 |
| 4,131,167 A * | 12/1978 | Richey | ............... | E21B 17/1078 175/323 |
| 4,245,709 A | 1/1981 | Manuel | | |
| 4,438,822 A * | 3/1984 | Russell | ............... | E21B 17/1078 175/325.5 |
| 5,335,723 A | 8/1994 | Mouton | | |
| 5,575,333 A | 11/1996 | Lirette et al. | | |
| 5,794,988 A * | 8/1998 | Gill | ............... | F16L 37/088 285/305 |
| 5,860,760 A | 1/1999 | Kirk | | |
| 6,186,560 B1 * | 2/2001 | Gill | ............... | F16L 21/08 285/305 |
| 6,435,275 B1 | 8/2002 | Kirk et al. | | |
| 6,533,034 B1 | 3/2003 | Barger | | |
| 8,668,007 B2 | 3/2014 | Casassa et al. | | |
| 2002/0112853 A1 | 8/2002 | Buytaert | | |
| 2010/0218956 A1 | 9/2010 | Buytaert et al. | | |

(Continued)

FOREIGN PATENT DOCUMENTS

WO    2012095671 A2    7/2012

OTHER PUBLICATIONS

International Searching Authority, International Search Report & Written Opinion for Application PCT/US2016/058170, Mailed Feb. 17, 2017, 12 pgs.

*Primary Examiner* — Jennifer H Gay
*Assistant Examiner* — Caroline Butcher

(57) ABSTRACT

A lock collar for locking a centralizer in place on a tubular of the type used in production strings in the oilfield. The lock collar relates to mechanisms such as stop rings or lock collars commonly used in downhole applications to prevent axial and/or rotational movement of centralizers mounted on the tubing or casing outer surface.

10 Claims, 8 Drawing Sheets

(56) References Cited

U.S. PATENT DOCUMENTS

2011/0114338 A1* 5/2011 Casassa .............. E21B 17/1042
166/382
2014/0000900 A1 1/2014 Leiper et al.

* cited by examiner

LOCKING COLLAR

FIELD OF THE INVENTION

The present invention is directed to a lock collar for securing a centralizer in place on a tubular of the type used in production strings in the oilfield. More specifically, the invention relates to stop rings or lock collars commonly used in downhole applications to prevent axial and/or movement of centralizers mounted on the tubing or casing outer surface.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

Within the area of subterranean drilling, centralizers are typically used to keep the casing centered during a cement job to prevent cementing the pipe against a side of the well. It is also desirable to reduce drag while installing tubing/casing into the wellbore, or isolating a tubing OD from a casing ID. Additionally, in long horizontal sections, the horizontal sections may be longer than the vertical sections. As a result, there is often insufficient hook load for gravitational insertion of the tubular section, making it necessary to push the tubular into the well. Rotating the pipe can ease installation.

In some cases, equipment such as sand screens and packers and valves are installed in a horizontal section of the well where there is potential for damage and/or significant amount of drag. It is desirable to not rotate screened sections in the system. To overcome this problem, swivel tools are located above the screens to prevent rotation of that section.

Various types of centralizers and stop rings or stop collars are used to protect the equipment and reduce drag. To further reduce drag and allow equipment to be installed in longer horizontal sections, there is need for the centralizer to withstand high axial loads and be rotationally locked to the tubing/casing OD. By locking the centralizer to the pipe OD, the equipment can be rotated to break out of tight spots and reduce the load required to push the equipment into the horizontal section.

Currently, stop rings/collars are anchored on the pipe OD by applying torque to two rings to energize a third C-ring type component, or installing set screws, hammering in wires or nails into a sleeve to produce friction between the mating parts. Some of these methods are considered a safety hazard and so there is desire for equipment to be safe and simple to install.

Thus there remains a need for an easy to install lock collar that does not require the use of special torqueing tools, or small fasteners, and that reliably prevents axial movement of the centralizer. It is also desirable to prevent rotation movement of the centralizer relative to the tubular.

SUMMARY OF THE INVENTION

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The concept of this invention is to provide a lock collar that resists rotation about the tubular and has a high resistance to axial movement along the tubular to secure centralizers in place. In one embodiment of the present invention, an internal spring is provided to induce a hoop stress into the tubular on which the stop collar resides. In one embodiment, a hydraulic or pneumatic tool can be used to axially compress an outer collar portion over an inner collar portion.

A first embodiment of the present invention provides for a lock collar for mounting to the exterior surface of a downhole well tubular. The lock collar has a cylindrical body with a hollow interior, an interior surface, and an exterior surface. A first interior channel is located on the interior surface. A second interior channel is also located on the interior surface. A first expandable spring member is provided having a pair of opposing ends and is located in the first channel. A second expandable spring member is provided having a pair of opposing ends and is located in the second channel.

A first aperture extends between the exterior surface and the first channel. A second aperture extends between the exterior surface and the second channel. A first retaining pin is removably located in the first aperture, between the ends of the first spring so as to hold the first spring in an expanded position. A second retaining pin is removably located in the second aperture, between the ends of the second spring so as to hold the second spring in an expanded position.

Another embodiment provides for a lock collar for mounting to the exterior surface of a downhole well tubular. The lock collar has a cylindrical body with a hollow interior, an interior surface, and an exterior surface. A generally spiral, or helical, interior channel is located on the interior surface. A first aperture extends between the exterior surface and the channel. A second aperture extends between the exterior surface and the channel. A first retaining pin is removably located in the first aperture. A second retaining pin is removably located in the second aperture. A helical spring is axially torqued into expansion and located in the channel, having its ends positioned against the retaining pins so as to hold the spring in the expanded position.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components. The terms "helical" and "spiral" are not intended to require perfectly mathematical helix or spirals, and are particularly intended to include square ended, closed ended, and ground versions of springs of these types, and also as the channels that would receive any of these shapes.

Figure 1:
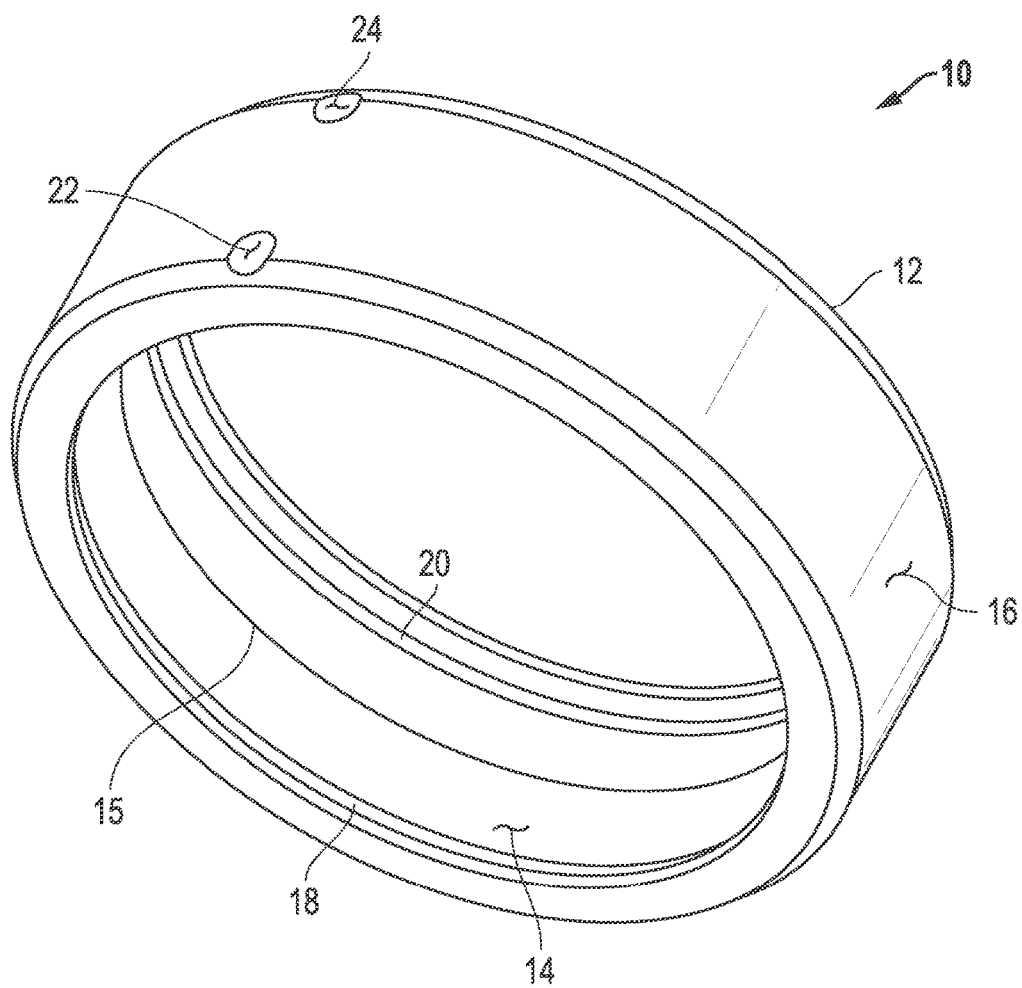
FIG. 1 is an isometric view of an embodiment of a lock collar illustrated in accordance with principles of the present invention described herein.

FIG. 1 is an isometric view of a first embodiment of a lock collar 10 illustrated in accordance with principles of the present invention described herein. Referring to FIG. 1, lock collar 10 has a cylindrical body 12 with a hollow interior. Lock collar 10 has an interior surface 14 and an exterior surface 16. Interior surface 14 may be wedge shaped, having a circumferential peak 15. A first interior channel 18 is located on interior surface 14. A second interior channel 20 is located on interior surface 14. A first aperture 22 extends between exterior surface 16 and first channel 18. A second aperture 24 extends between exterior surface 16 and second channel 20.

Figure 2:
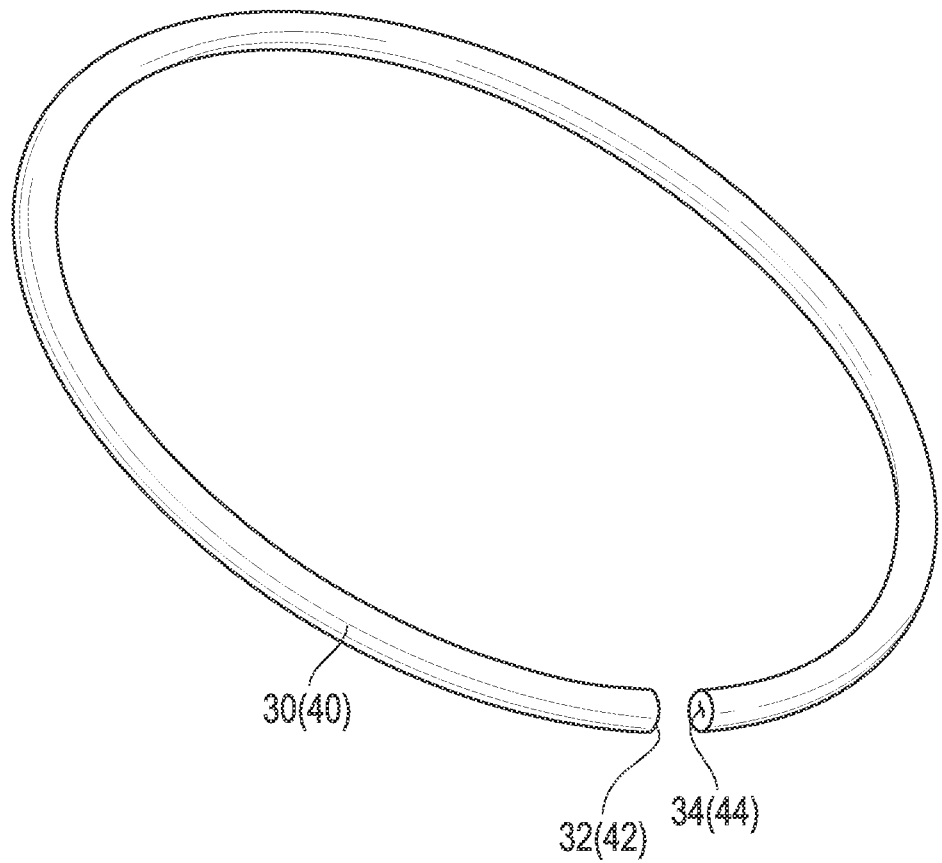
FIG. 2 is an isometric view of a spring member for use with the lock collar of FIG. 1.

FIG. 2 is an isometric view of a typical first and second expandable spring member 30 and 40, respectively, having a pair of opposing ends 32 (42) and 34 (44).

Figure 3:
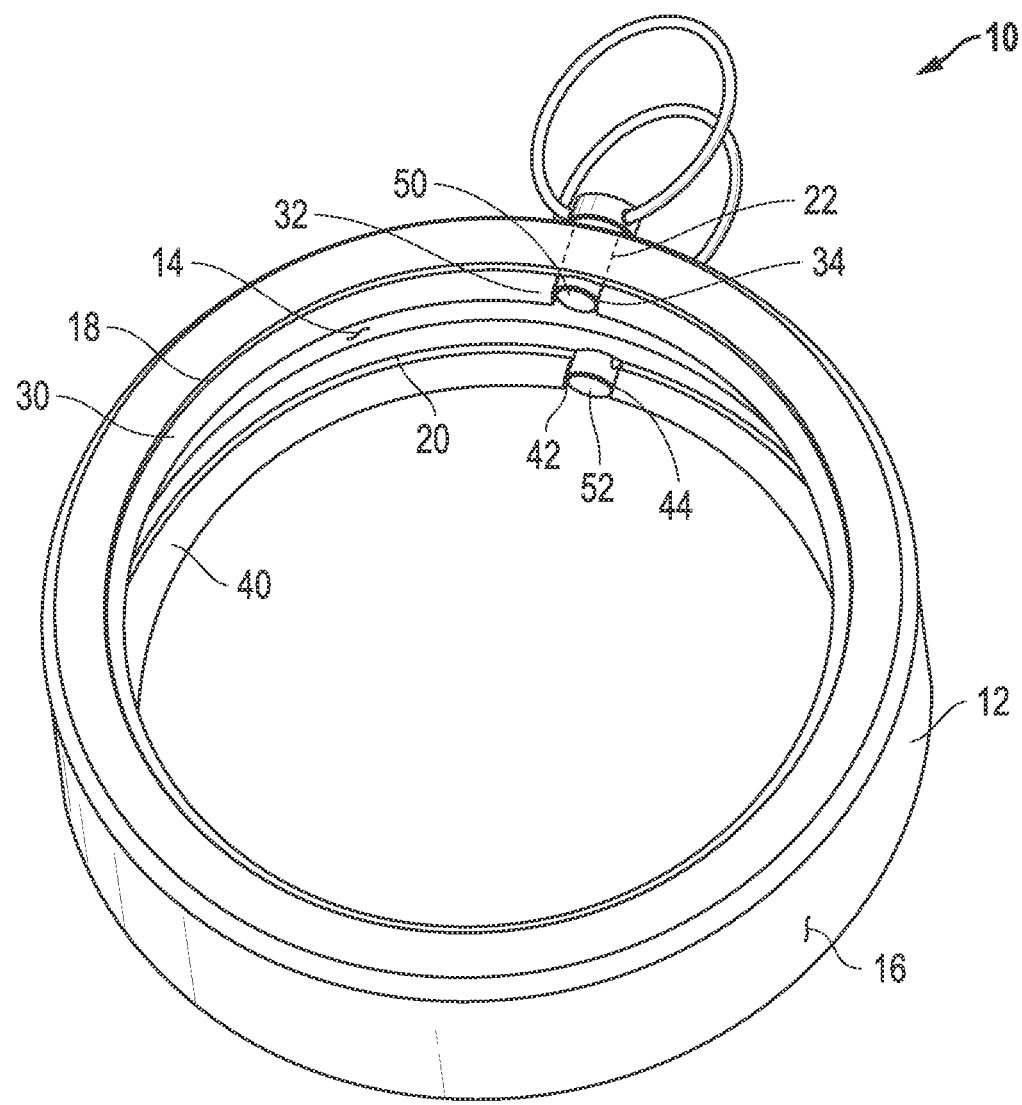
FIG. 3 is an isometric view of the lock collar illustrated with the spring member of FIG. 2 in place.

FIG. 3 is an isometric view of lock collar 10 illustrated with first spring member 30 located in first channel 18. Opposing ends 32 and 34 of first spring 30 are positioned adjacent to aperture 22. Second expandable spring member 40 is located in second channel 20. Opposing ends 42 and 44 of second spring 40 are positioned adjacent to aperture 24.

A first retaining pin 50 is removably located in first aperture 22, between ends 32 and 34 of first spring 30 so as to hold first spring 30 in an expanded position. A second retaining pin 52 is removably located in second aperture 24 between ends 42 and 44 of second spring 40 so as to hold second spring 40 in an expanded position.

With first and second springs 30 and 40 held in the expanded position by their respective retaining pins 50 and 52, lock collar 10 may be placed over the exterior surface of the down hole well tubular to which it will lock. This is possible because the interior diameter of first and second springs 30 and 40 in the expanded state is equal to or greater than the exterior diameter of the tubular.

As illustrated, first and second retaining pins 50 and 52 are removable from exterior surface 16 side of lock collar 10. The interior diameter of first and second springs 30 and 40 in an unexpanded state is less than the exterior diameter of the tubular over which lock collar 10 will be located. In this manner, removal of retaining pins 50 and 52 will release spring members 30 and 40 such that they will grip the exterior surface of the downhole well tubular.

Figure 4:
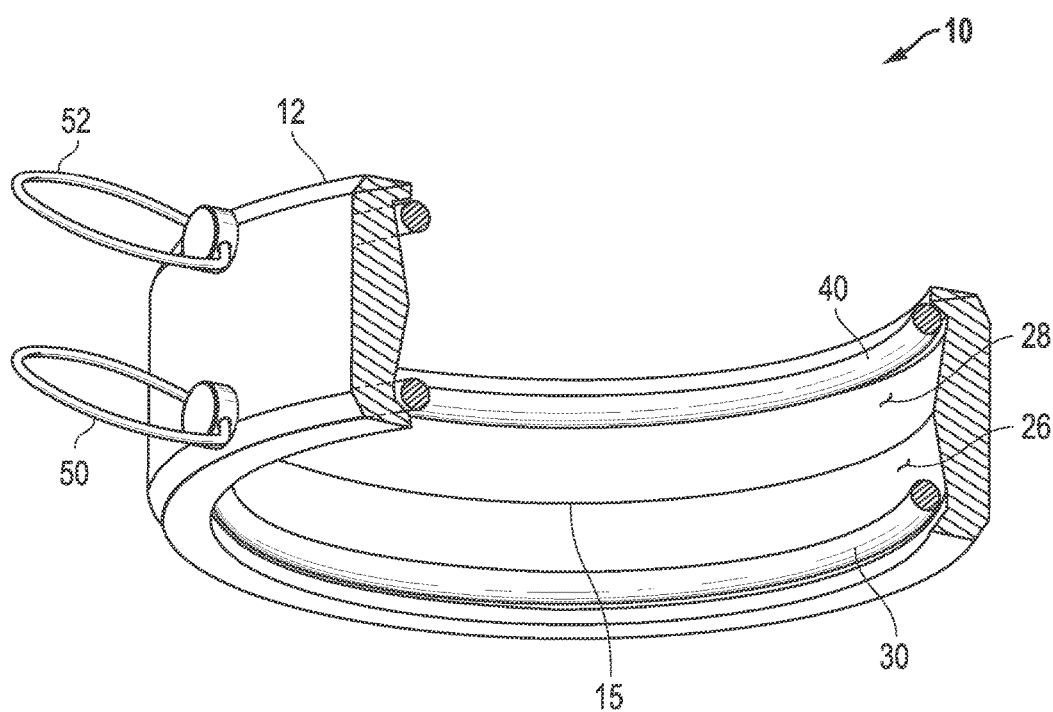
FIG. 4 is an isometric sectioned view of the lock collar illustrated with the spring member of FIG. 2 in place.

FIG. 4 is an isometric sectioned view of lock collar 10 illustrated with spring members 30 and 40 held in channels 18 and 20 by retainers 50 and 52. Circumferential peak 15 creates a wedge shape to which a wedge surface 26 urges spring 30 outwardly. Similarly, circumferential peak 15 creates a wedge shape to which a wedge surface 28 urges spring 40 outwardly. Wedges 26 and 28 discourage axial movement of springs 30 and 40 in relationship to circumferential peak 15, thus strengthening the gripping force of lock collar 10 on the tubular to which it is attached.

In another embodiment, springs 30 and 40 may have a knurled or profiled surface to assist in gripping the pipe OD.

Figure 5:
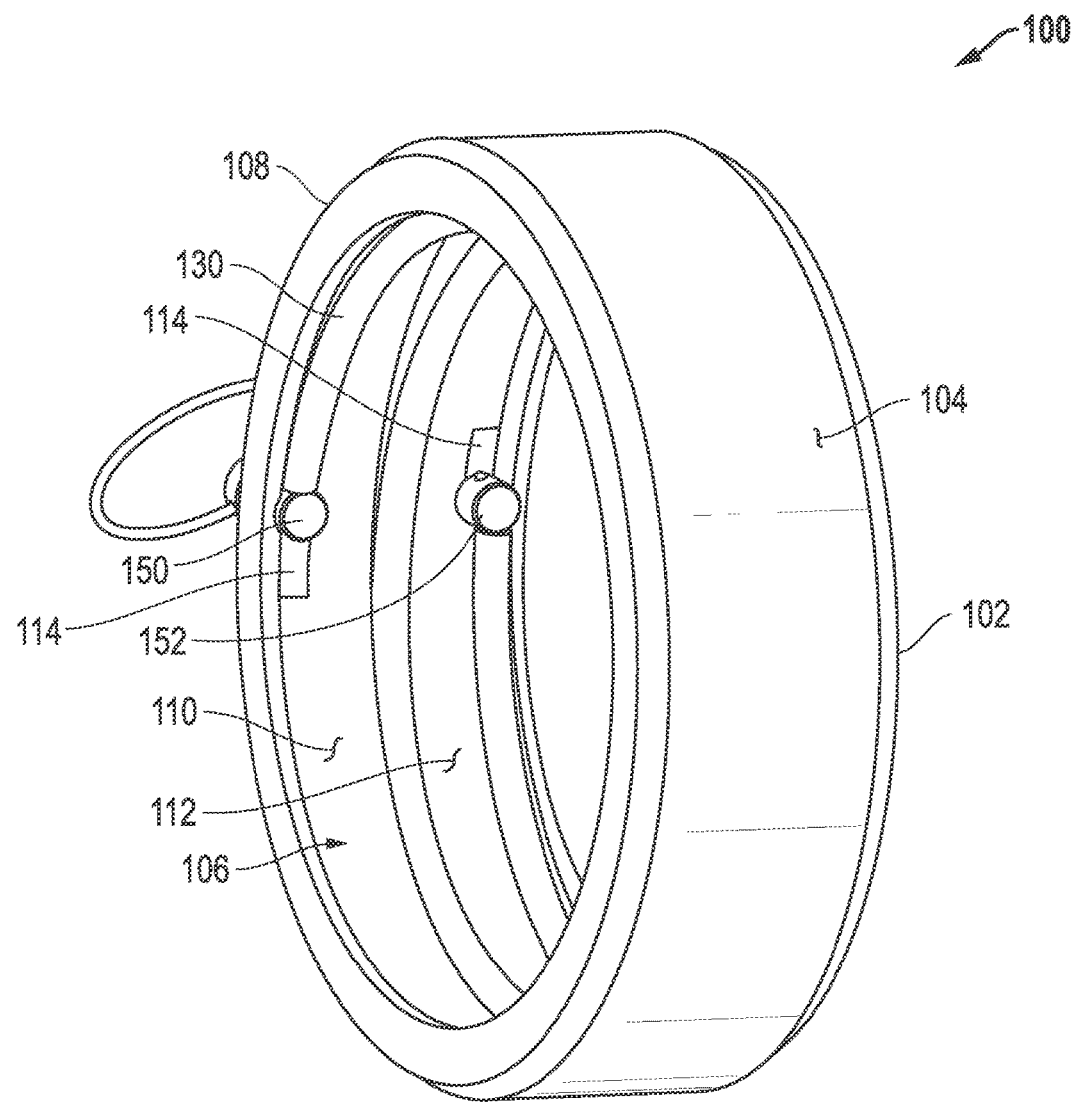
FIG. 5 is an isometric view of a second embodiment of a lock collar illustrated in accordance with principles of the present invention described herein.

FIG. 5 is an isometric view of a second embodiment of a lock collar illustrated in accordance with principles of the present invention described herein. As illustrated in FIG. 5, lock collar 100 has a cylindrical body 102 with a hollow interior. Lock collar 100 has an exterior surface 104 and an interior surface 106. Interior surface 106 may be wedge shaped, having a circumferential peak 108. Peak 108 forms opposing wedge surfaces 110 and 112. A generally helical interior channel 114 is located on interior surface 106.

A first aperture 122 (not visible) extends between exterior surface 104 and helical channel 114. A first retaining pin 150 is removably located in first aperture 122. A second aperture 124 (not visible) extends between exterior surface 104 and channel 114. A second retaining pin 152 is removably located in second aperture 124.

Figure 6:
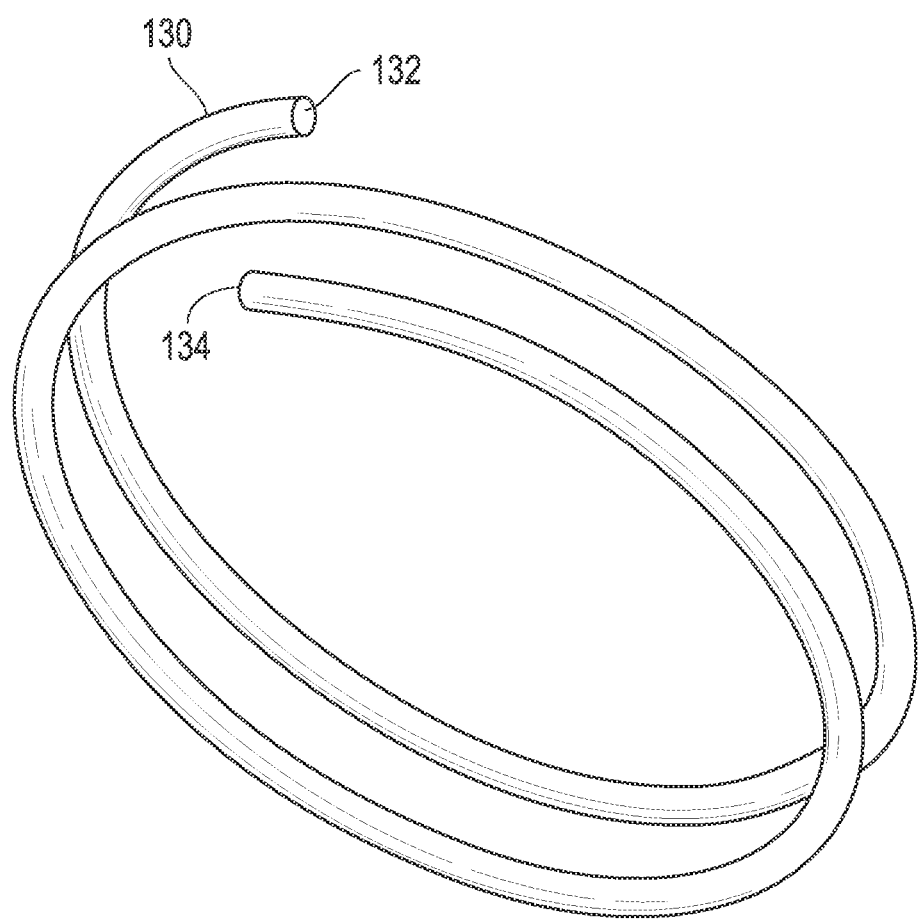
FIG. 6 is an isometric view of a spring member for use with the lock collar of FIG. 5.

FIG. 6 is an isometric view of an expandable helical spring member 130, having a first end 132 and an opposite second end 134. Spring 130 is illustrated in an embodiment in which it has open ends, and is not ground. Referring back to FIG. 5, spring member 130 is located in channel 114, between retaining pins 150 and 152.

Figure 7:
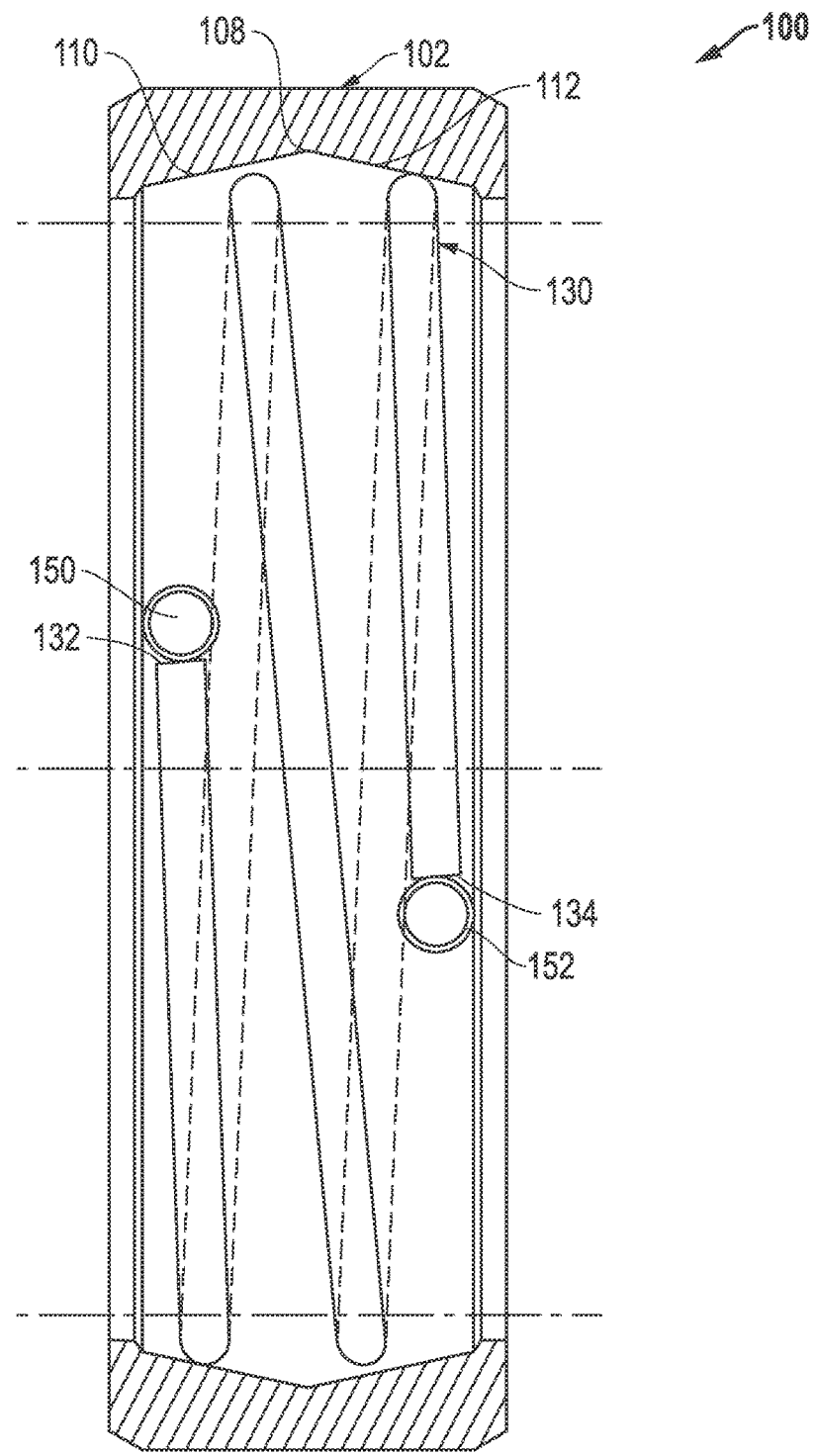
FIG. 7 is a cross-sectional view of the lock collar of FIG. 5.

FIG. 7 is a cross-sectional view of lock collar 100 illustrated with spring member 130 located in channel 114. End 132 of spring 130 is in engagement with retaining pin 150. End 134 of spring 130 is in engagement with retaining pin 152. Spring 130 engages interior wedges 110 and 112. The open end, or not ground design, of spring 130 requires less axial force for lock collar 100 to grip the pipe OD due to the "point load" contact between the end of the last coil and wedge 110 and 112 surfaces.

With spring 130 held in the expanded position by retaining pins 150 and 152, lock collar 100 may be placed over the exterior surface of the downhole well tubular to which it will lock. This is possible because the interior diameter of spring 130 in the expanded state is equal to or greater than the exterior diameter of the tubular.

First and second retaining pins 150 and 152 are removable from exterior surface 104 side of lock collar 100. The interior diameter of spring 130 in an unexpanded state is less than the exterior diameter of the tubular over which lock collar 100 will be located. In this manner, removal of retaining pins 150 and 152 will release spring member 130 such that it will grip the exterior surface of the downhole well tubular.

Figure 8:
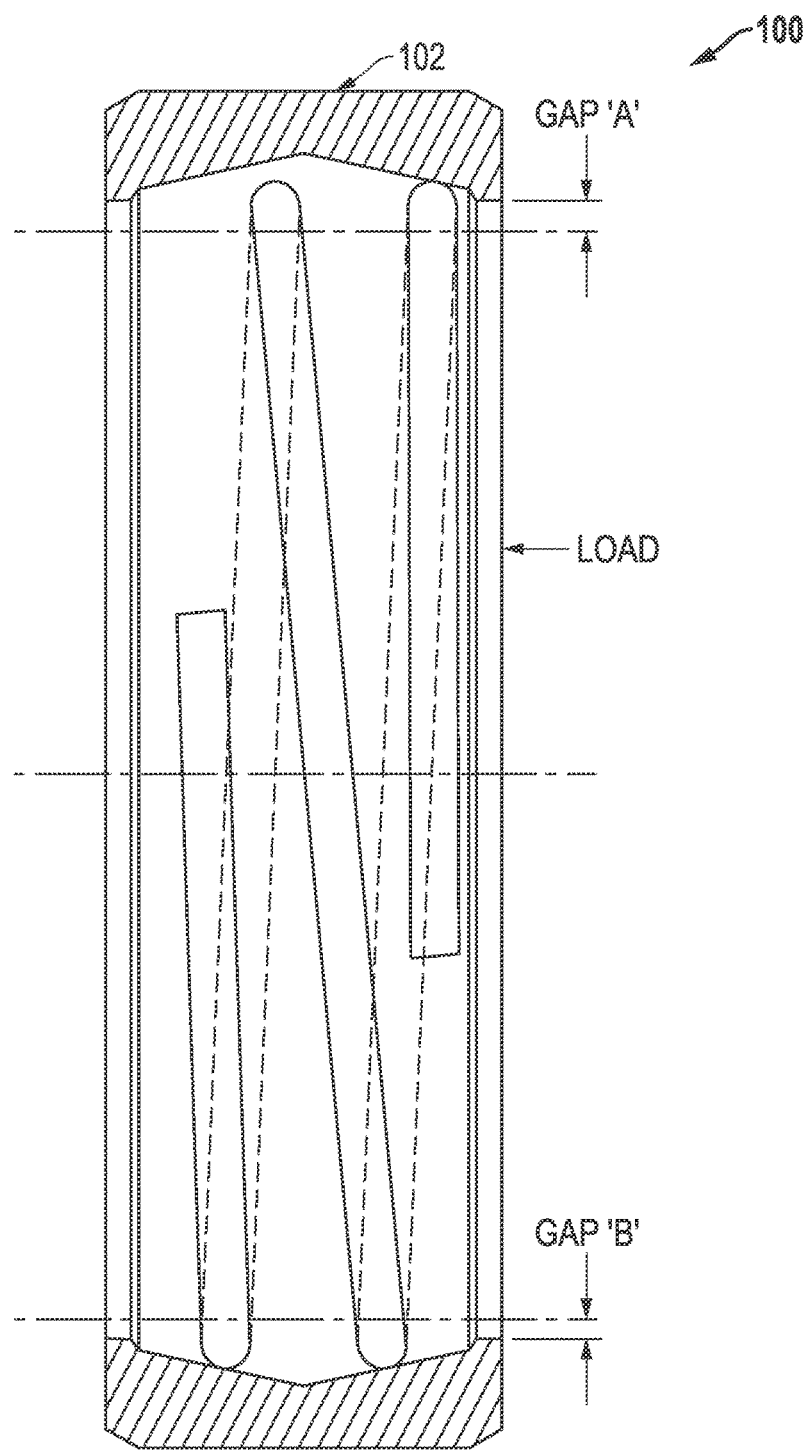
FIG. 8 is a cross-sectional view of the lock collar of FIG. 5, showing the function of the wedge surface in response to axial force against the lock collar.

FIG. 8 is a cross-sectional view of lock collar 100 illustrated with spring member 130 located in channel 114. Circumferential peak 108 separates interior wedges 110 and 112. Wedges 110 and 112 discourage axial movement of spring 130 in relationship to circumferential peak 108, thus strengthening the gripping force of lock collar 100 on the tubular to which it is attached. In another embodiment, spring 130 may have a knurled or profiled surface to assist in gripping the pipe OD. As shown in FIG. 8, lock collar 100 may become slightly offset from the pipe diameter as the load is increased; the "point contact" will become a "line contact" between the last coil and the wedge surfaces 110 and 112. See Gap 'A' and Gap 'B' of FIG. 8.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A lock collar for mounting to the exterior surface of a downhole well tubular,
comprising:
a cylindrical body;
the body having a hollow interior, and having an interior surface and an exterior surface;
a first interior channel located on the interior surface;
a second interior channel located on the interior surface, the interior surface having a pair of opposing wedge sections meeting at a peak at a location between the first interior channel and the second interior channel;
a first aperture extending between the exterior surface and the first interior channel;
a second aperture extending between the exterior surface and the second interior channel;
a first expandable spring member having a pair of opposing ends, located in the first interior channel;
a second expandable spring member having a pair of opposing ends, located in the second interior channel;
a first retaining pin configured to be removably located in the first aperture and between the ends of the first expandable spring member so as to hold the first expandable spring member in an expanded position when said first retaining pin is located in the first aperture and between the ends of the first expandable spring member; and, a second retaining pin configured to be removably located in the second aperture and between the ends of the second expandable spring member so as to hold the second expandable spring member in an expanded position when said second retaining pin is located in the second aperture and between the ends of the second expandable spring member.

2. The lock collar of claim 1 further comprising:
wherein the first and second expandable spring members are held in the expanded position by the retaining pins, such that the lock collar may be placed over the exterior surface of the downhole well tubular.

3. The lock collar of claim 1 further comprising:
wherein the first and second retaining pins are removable from the exterior surface side of the lock collar.

4. The lock collar of claim 1 further comprising:
wherein an interior diameter of the first and second expandable spring members in an unexpanded state is less than the exterior diameter of the tubular over which the lock collar will be located, and, wherein an interior diameter of the first and second expandable spring members in an expanded state is equal to or greater than the exterior diameter of the tubular over which the lock collar will be located.

5. A lock collar for mounting to the exterior surface of a downhole well tubular, comprising:
a cylindrical body;
the body having a hollow interior, and having an interior surface and an exterior surface;
a helical interior channel located on the interior surface;
a first aperture extending between the exterior surface and the helical interior channel;
a second aperture extending between the exterior surface and the helical interior channel, the interior surface having a pair of opposing wedge sections meeting at a peak at a location between the first and second apertures;
an expandable spring member having a pair of opposing ends, located in the helical interior channel;
a first retaining pin removably located in the first aperture; and,
a second retaining pin removably located in the second aperture.

6. The lock collar of claim 5, further comprising:
wherein the expandable spring member is held in the expanded position by the retaining pins, such that the lock collar may be placed over the exterior surface of the downhole well tubular.

7. The lock collar of claim 5 further comprising:
wherein the first and second retaining pins are removable from the exterior surface side of the lock collar.

8. The lock collar of claim 5 further comprising:
wherein an interior diameter of the expandable spring member in an unexpanded state is less than the exterior diameter of the tubular over which the lock collar will be located, and, wherein an interior diameter of the expandable spring member in an expanded state is equal to or greater than the exterior diameter of the tubular over which the lock collar will be located.

9. A lock collar for mounting to an exterior surface of a downhole well tubular, said lock collar comprising:
a cylindrical body having a hollow interior, said cylindrical body also having an interior surface and an exterior surface, said interior surface of said cylindrical body having an inner diameter such that said cylindrical body can be disposed peripherally surrounding said exterior surface of said downhole well tubular;
a first interior channel disposed in said interior surface of said cylindrical body;
a second interior channel disposed in said interior surface of said cylindrical body, said interior surface of said cylindrical body having a pair of opposing wedge sections meeting at a peak at a location between said first interior channel and said second interior channel;

a first aperture extending from said exterior surface of said cylindrical body and into said first interior channel;

a second aperture extending from said exterior surface of said cylindrical body and into said second interior channel;

a first expandable spring member having a pair of opposing ends and an interior diameter, said first expandable spring member having an expanded position in which said interior diameter of said first expandable spring member is not less than a diameter of said exterior surface of said downhole well tubular, said first expandable spring member also having an unexpanded position in which said interior diameter of said first expandable spring member is less than said diameter of said exterior surface of said downhole well tubular, said first expandable spring member configured to reside in said first interior channel when in said expanded position;

a second expandable spring member having a pair of opposing ends and an interior diameter, said second expandable spring member having an expanded position in which said interior diameter of said second expandable spring member is not less than said diameter of said exterior surface of said downhole well tubular, said second expandable spring member also having an unexpanded position in which said interior diameter of said second expandable spring member is less than said diameter of said exterior surface of said downhole well tubular, said first expandable spring member configured to reside in said second interior channel when in said expanded position;

a first retaining pin having a first position within said first aperture and between said pair of opposing ends of said first expandable spring member so as to retain said first expandable spring member in said expanded position, said first retaining pin having a second position not between said pair of opposing ends of said first expandable spring member such that said first expandable spring member is not retained in said expanded position and said first expandable spring member is able to grip said exterior surface of said downhole well tubular;

a second retaining pin having a first position within said second aperture and between said pair of opposing ends of said second expandable spring member so as to retain said second expandable spring member in said expanded position, said second retaining pin having a second position not between said pair of opposing ends of said second expandable spring member such that said second expandable spring member is not retained in said expanded position and said second expandable spring member is able to grip said exterior surface of said downhole well tubular, said pair of opposing wedge sections further configured to discourage movement of said first expandable spring member and said second expandable spring member with respect to said peak, such that a gripping force of said lock collar on said exterior surface of said downhole well tubular is increased.

10. A lock collar for mounting to an exterior surface of a downhole well tubular, said lock collar comprising:

a cylindrical body having a hollow interior, said cylindrical body also having an interior surface and an exterior surface, said interior surface of said cylindrical body having an inner diameter such that said cylindrical body can be disposed peripherally surrounding said exterior surface of said downhole well tubular, a helical interior channel disposed in said interior surface of said cylindrical body;

a first aperture extending from said exterior surface of said cylindrical body and into said helical interior channel;

a second aperture extending from said exterior surface of said cylindrical body and into said helical interior channel, said interior surface of said cylindrical body having a pair of opposing wedge sections meeting at a peak at a location between said first aperture and said second aperture;

an expandable spring member having a first end and a second end and an interior diameter, said expandable spring member having an expanded position in which said interior diameter of said expandable spring member is not less than a diameter of said exterior surface of said downhole well tubular, said expandable spring member also having an unexpanded position in which said interior diameter of said expandable spring member is less than said diameter of said exterior surface of said downhole well tubular, said expandable spring member configured to reside in said helical interior channel when in said expanded position;

a first retaining pin having a first position within said first aperture and contacting said first end of said expandable spring member so as to retain said expandable spring member in said expanded position, said first retaining pin having a second position not contacting said first end of said expandable spring member such that said expandable spring member is not retained in said expanded position and said expandable spring member is able to grip said exterior surface of said downhole well tubular;

a second retaining pin having a first position within said second aperture and contacting said second end of said expandable spring member so as to retain said expandable spring member in said expanded position, said second retaining pin having a second position not contacting said second end of said expandable spring member such that said expandable spring member is not retained in said expanded position and said expandable spring member is able to grip said exterior surface of said downhole well tubular, said pair of opposing wedge sections further configured to discourage movement of said expandable spring member with respect to said peak, such that a gripping force of said lock collar on said exterior surface of said downhole well tubular is increased.

* * * * *